United States Patent Office.

CHARLES SEIDEL, OF NEW YORK, N. Y.

Letters Patent No. 61,957, dated February 12, 1867.

IMPROVED CHEMICAL COMPOSITION FOR BLASTING ROCKS.

*The Schedule referred to in these Letters Patent and making part of the same.*

TO ALL WHOM IT MAY CONCERN:

Be it known that I, CHARLES SEIDEL, of the city, county, and State of New York, have invented a new and useful Chemical Compound for Blasting Rocks; and do hereby declare that the following is a full, clear, and exact description of the same.

My invention relates to a combination of matter to be used in blasting rocks and for like purposes, and consists of a powder (or pulverized ingredients) and a fluid composition. Both the powder and fluid being of themselves non-explosive, they can be carried separately in suitable vessels without the slightest danger of exploding from friction or heat; but when united and agitated by friction or a burning fuse applied to the combination, a powerful explosion is produced.

The chemical combination which comprises my invention is as follows: The said powder I make of one part of sulphuret of antimony and two parts of chlorate of potassa, pulverized and properly mixed; for the fluid composition I take one part of phosphorus dissolved in four parts of bisulphuret of carbon. And I employ both powder and fluid in the following manner: In the first place I prepare the rock to be rent by tamping the crevice, (if such should exist,) or by drilling a hole in the rock. I then insert the powder in the hole so made, and next pour the fluid on the powder. The powder and fluid I use in their proper proportions by weight, and in bulk according to the strength of the charge required, say about one part of fluid to seven parts of powder. I now, by means of a friction-rod attached to a string, agitate the fluid and powder, or apply burning fuse, if preferred, to the compound, when a powerful explosion will result. And thus my invention will be found of much value to miners and others, because of its convenience in use, and efficiency.

Having described my invention, what I claim as new, and desire to secure by Letters Patent, is—

The above-described composition of matter, substantially as and for the purposes described and set forth.

In testimony whereof I have hereunto set my signature.

CHARLES SEIDEL.

Witnesses:
   A. NEILL,
   HENRY D. B. LEFFERTS.